United States Patent [19]

Leibhard

[11] 4,317,529
[45] Mar. 2, 1982

[54] DEVICE FOR THE MELTING AND THE DOSE DISCHARGE OF THERMOPLASTIC MATERIAL

[75] Inventor: Erich Leibhard, Munich, Fed. Rep. of Germany

[73] Assignee: Hilti Aktiengesellschaft, Schaan, Liechtenstein

[21] Appl. No.: 59,234

[22] Filed: Jul. 19, 1979

[30] Foreign Application Priority Data

Jul. 26, 1978 [DE] Fed. Rep. of Germany ....... 2832805

[51] Int. Cl.³ .............................................. B67D 5/62
[52] U.S. Cl. ............................. 222/146 HE; 219/421
[58] Field of Search ................ 239/133, 135; 219/230, 219/421; 222/146 HE, 146 H; 228/52, 53; 126/343.5 R, 343.5 A

[56] References Cited

U.S. PATENT DOCUMENTS

| | | | |
|---|---|---|---|
| 2,380,138 | 7/1945 | Abramson | 228/53 |
| 3,166,065 | 1/1965 | Dunn | 126/343.5 R |
| 3,377,012 | 4/1968 | Cushman | 228/53 |
| 3,430,816 | 3/1969 | Nadherny et al. | 222/146 HE |
| 3,550,815 | 12/1970 | Salonen | 222/146 HE |
| 3,825,155 | 7/1974 | Morault | 222/146 HE |
| 4,060,180 | 11/1977 | Wieland | 222/146 HE |
| 4,090,643 | 5/1978 | Wilkinson et al. | 222/146 HE |

FOREIGN PATENT DOCUMENTS 2444137 4/1975 Fed. Rep. of Germany ...HE 222/146

*Primary Examiner*—H. Grant Skaggs
*Attorney, Agent, or Firm*—Toren, McGeady & Stanger

[57] ABSTRACT

In a device for the melting and the dose discharge of thermoplastic material, a melting chamber is located within a housing. The material is introduced in solid rod form into the inlet end of the melting chamber where it is melted and discharged through the opposite end by a displacement member. A closure member is mounted in the housing and closes the discharge end of the melting chamber. The displacement member is formed as a part of the closure member and extends from it into the melting chamber. The displacement member has a length equal to about one-third the length of the melting chamber.

8 Claims, 1 Drawing Figure

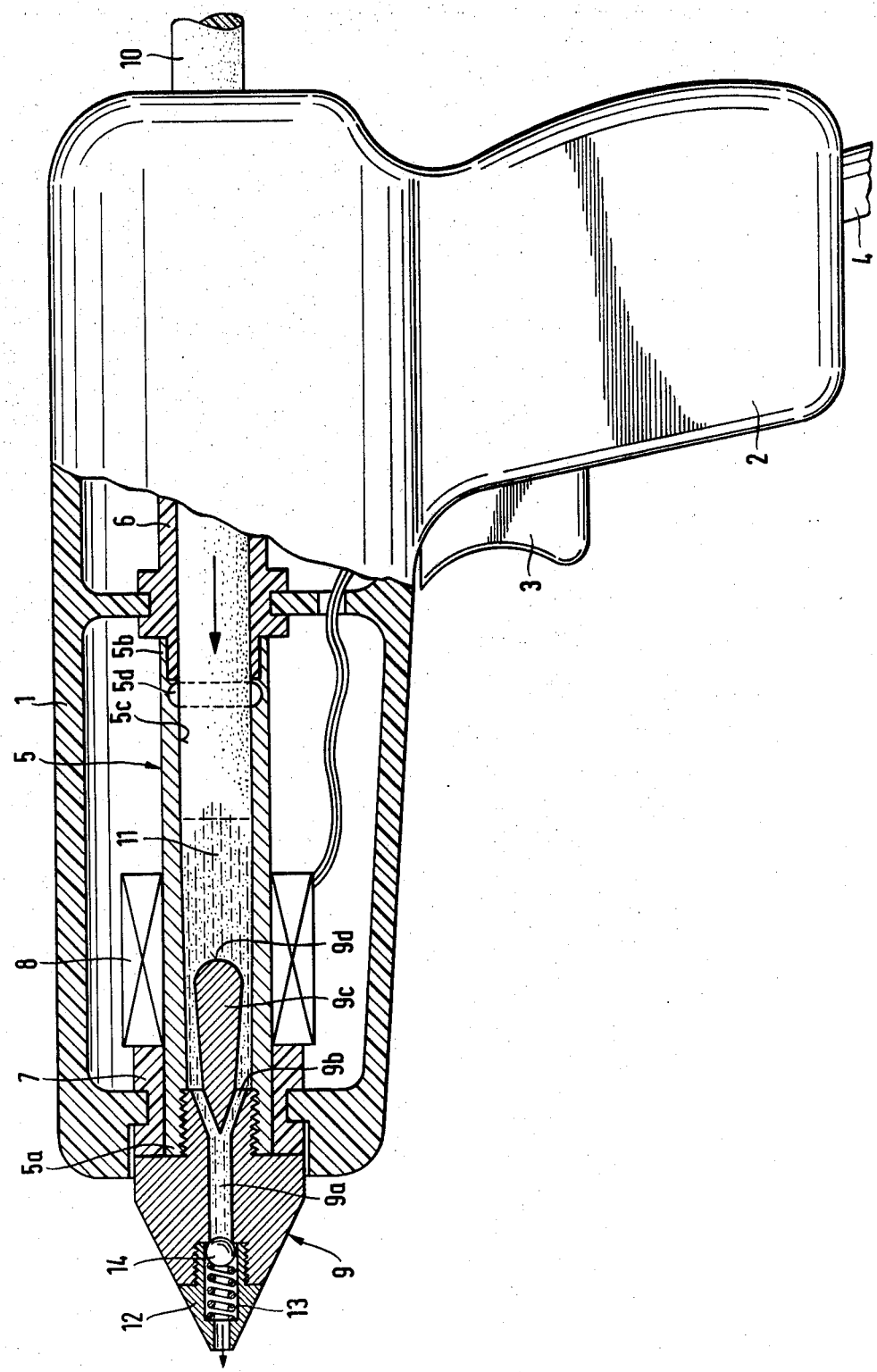

DEVICE FOR THE MELTING AND THE DOSE DISCHARGE OF THERMOPLASTIC MATERIAL

SUMMARY OF THE INVENTION

The present invention is directed to a device for the melting and the dose discharge of thermoplastic material. The device includes a housing, a melting chamber located in the housing, a closure member located in the housing and forming a closure for the discharge end of the melting chamber. The closure member contains a plurality of discharge openings for the molten material. A displacement member is located within the melting chamber adjacent the closure member.

Devices of this general type are finding increasing use in trade and industry. Contrary to the stationary devices long in use in the shoe industry, compact mobile devices are being used. Unlike the devices used in fabrication processes in industry where the discharged amount of the molten thermoplastic material remains relatively constant, in portable devices the discharged amount can vary significantly over a given time period. When the melting power of the heating element is designed for the peak value and when the heated device remains unused for a given period, the entire melting chamber becomes overheated and the thermoplastic material is melted even at the inlet end into the melting chamber. Accordingly, in a certain orientation of the device, the molten material can flow rearwardly and block the entire feed mechanism.

In known devices the structural arrangement of the surface in contact with the thermoplastic material is increased to afford a higher melting power with a relatively small heating element. This measure, however, is only partially successful. Since the melting heat is introduced from the outside into the melting chamber, melting the core of the material takes much longer than melting the peripheral portion. It is possible that parts of the core may remain solid and clog the discharge openings at least partially and, thereby, interfere with the discharge of the molten matrial.

These problems have been recognized and in a known device it has been attempted to eliminate the disadvantages experienced by placing a displacement body in the melting chamber. The displacement body is supported in the melting chamber by a pair of heating elements which extend through the displacement body perpendicularly relative to the length of the melting chamber. In this arrangement a concentric annular gap is present between the displacement body and the inner wall of the melting chamber. In this device, the melting heat flows almost exclusively through the displacement body into the material. Accordingly, a uniform supply of heat into the chamber is not possible. Moreover, because of the increase in volume which occurs in most thermoplastic materials during melting, an excess pressure is developed in the annular gap which might press the melted material rearwardly out of the inlet end of the melting chamber.

Therefore, the primary object of the present invention is to provide a device for the melting and the dose discharge of thermoplastic material in which an adequate melting power is supplied and, in addition, the thermoplastic material remains solid at the inlet end into the melting chamber when the device is in the switched-on state but is not used for an extended period of time.

In accordance with the present invention, the device is provided with a displacement body located in the melting chamber and connected directly to the closure member which is located at the discharge end of the melting chamber. Further, the displacement member extends for approximately one-third the length of the melting chamber from its discharge end to its inlet end.

Since the displacement body is connected to the closure member, with a suitable choice of material a satisfactory conduction of heat is attained from the heated melting chamber through the closure member into the displacement body. Accordingly, the hottest part of the displacement body is at its connection to the closure member. If parts of the thermoplastic material reach the location of the connection between the displacement body and the closure member, without being melted, the solid parts are melted due to the high temperature at this location and, accordingly, the discharge openings are not blocked. Since the displacement body extends from the discharge end of the melting chamber for only about one-third of the length of the melting chamber, the process of melting the thermoplastic material commences only about the middle third of the chamber due to heat conductivity. Even though the molten material is retained in the melting chamber for an extended period of time without being discharged, the thermoplastic material remains solid at the rearward or inlet end of the melting chamber.

To assure optimum heat conduction from the closure member to the displacement body, it is advantageous if the displacement body is formed integrally with the closure member. In addition to the improved heat conduction as compared to a threaded connection, such an arrangement has the economical advantage that the construction in one piece can be produced more simply and, therefore, less expensively. Moreover, an additional assembly step is omitted.

To achieve uniform melting of the thermoplastic material around the displacement body and to limit resistance to flow as much as possible, it is advantageous if the displacement body is arranged concentrically at the discharge end of the melting chamber so that the arrangement of the discharge openings are symmetrical around the displacement body. By such an arrangement of the displacement body it is ensured that the distribution of heat around the displacement body is uniform.

As mentioned above, as most thermoplastic materials are melted, there is an increase in volume. To prevent a high pressure from developing in the melting chamber because of such an increase in volume, it is advantageous if the displacement body tapers conically inward toward the discharge end of the melting chamber. As a result of this tapering configuration of the displacement body, the annular gap between the displacement body and the inner wall of the melting chamber increases toward the discharge end of the chamber. Moreover, such an increase in cross section toward the discharge end reduces the effects of a possible pressure increase at the inlet end of the melting chamber from any possible pressure increase in the range of the displacement body.

To afford any desired effect at all, a certain minimum of the inward tapering of the displacement body toward the discharge end of the melting chamber, is required. The extent of the tapering, however, must not be too large to avoid any development of a negative pressure in the melting chamber during a maximum melting effect. Tapering the displacement body in a ratio of about 1:15 has been found to be advantageous in practice. With such a tapering ratio, the above-mentioned disadvantageous phenomenon did not occur.

To assure that the temperature of the displacement body is about equal around its surface at its end more remote from the closure member, in accordance with another feature of the present invention, the free or trailing end of the displacement body, that is the end more remote from the closure member, is constructed hemispherically. If a displacement body is used which tapers to a point at its trailing end, as compared to the hemispherically shaped surface in the present invention, the temperature at the pointed tip is significantly lower than at the remaining surfaces of the displacement body.

Generally, the thermoplastic materials employed in such a device are in the form of a solid rod. In practice, however, the diameter of such rods vary widely. As a result, it is quite difficult to seal the inlet end of the melting chamber to prevent molten material from leaking out. Therefore, to ensure an adequate fitted insertion of rods of different diameters into the melting chamber, it is advantageous if the inner surface of the melting chamber tapers conically over its entire length. With such a tapered configuration of the inner surface of the melting chamber, it is possible to assure that the solid portion of the rod contacts the inner surface and forms a seal for the inlet end of the melting chamber.

To ensure that the location where the rod contacts the inner surface of the melting chamber is within a certain region, it is advantageous if the tapering ratio of the melting chamber is about 1:50. Such a ratio is sufficient to compensate for any differences in diameter of the solid rod.

If a rod of different cross-section is used or if the feed pressure is too high, it is possible that molten material may find its way to the inlet end of the melting chamber. To prevent the molten material from flowing out of the trailing or inlet end of the melting chamber, it is advantageous if an annular groove is provided in the surface of the melting chamber adjacent its inlet end. Any liquid material enters into the annular groove and, thus, forms an additional seal.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in where there are illustrated and described preferred embodiments of the invention.

BRIEF DESCRIPTION OF THE DRAWING

In the drawing:

A side view of the device embodying the present invention is shown, partly in section.

DETAIL DESCRIPTION OF THE INVENTION

In the drawing, the device for the melting and the dose discharge of thermoplastic materials is formed of a housing 1 with a handle 2 extending outwardly from its right-hand end. As viewed in the drawing, the left-hand end of the housing is its front end and the right-hand end is its rear end. A trigger 3 is mounted in the handle and, when actuated, effects a discharge of the thermoplastic material from the front end of the housing, in accordance with a known procedure. In addition, an electrical supply line 4 depends from the lower end of the handle 2. A melting chamber 5 is located within the housing and has its length dimension extending in the front end-rear end direction of the housing. The melting chamber has a discharge end 5a adjacent the front end of the housing and an inlet end 5b intermediate the front and rear ends of the housing. Melting chamber 5 is supported at its inlet end 5b by means of an insulating sleeve 6 extending toward the rearward end of the housing. Support for the discharge end 5a of the melting chamber is provided by an insulating ring 7 mounted in the front end of the housing. A tubular heating element 8 is positioned on and extends around the outside surface of the melting chamber 5. Heating element 8 transfers heat to the melting chamber 5. Insulating sleeve 6 and insulating ring 7 prevent heat transfer from the melting chamber 5 to the housing 1. A closure member 9 is threaded into and closes the discharge end 5a of the melting chamber 5. The closure member 9 projects outwardly from the front end of the housing 1. A solid rod 10 of thermoplastic material extends into the rear end of the housing. When the trigger 3 is squeezed, the solid rod of thermoplastic material is moved forwardly through the housing 1 into the inlet end of the chamber 5 by a transport device, not shown. As mentioned above such a transport device is known per se. Closure member 9 includes a central common duct 9a extending rearwardly from its forward end to a plurality of discharge openings 9b. Forwardly of the inlet end 5b, the rod 10 is melted and changed into a liquid molten material 11. A nozzle 12 is located in the front end of the closure member 9. Nozzle 12 contains a one-way valve consisting of a spring 13 which biases a ball 14 against the front end of the common duct 9a. This one-way valve blocks molten material 11 from leaking out of the nozzle 12 when the trigger is not squeezed. If pressure is built up in the melting chamber 5 by actuating the transport device through the trigger 3, the pressure developed acts through the discharge openings 9b and the common duct 9a against the ball 14 displacing it forwardly against the spring 13 opening the one-way valve so that a dose discharge of the molten material 11 can flow from the nozzle 12. A displacement body 9c is located within the forward portion of the melting chamber 5 extending from its discharge end toward the inlet end. Displacement body 9c is formed integrally with the closure member 9. The axially extending surface of the displacement member 9c is conically tapered from the forward end toward the rearward end. The tapering ratio of the displacement body 9c is about 1:15. The rear or free end 9d of the displacement body 9c is hemispherically shaped from the trailing end of the conically shaped surface. The hemispherical shape of the rear end of the displacement body assures that the surface temperature of the displacement body is approximately the same on all of its surfaces.

The inner surface 5c of the melting chamber is conically tapered over its entire length, tapering inwardly from the inlet end 5b to the discharge end 5a. The inner surface of the melting chamber 5 has a tapering ratio of about 1:50. Due to the conical shape of the melting chamber 5, it is possible to assure that the solid rod 10 of thermoplastic material directly contacts the inner surface 5c of the melting chamber assuring a good melting efficiency. Adjacent its inlet end 5b, the inner surface 5c of the melting chamber 5 has an annular groove 5d. If any molten material 11 is displaced rearwardly by pressure developed within the forward part of the melting chamber, the molten material enters into the annular groove 5d. Accordingly, the molten thermoplastic material acts as an additional seal at the inlet end 5b of the melting chamber 5.

While specific embodiments of the invention have been shown and described in detail to illustrate the application of the inventive principles, it will be understood that the invention may be embodied otherwise without departing from such principles.

What is claimed is:

1. Device for the melting and the dose discharge of thermoplastic material comprising a housing having a front end and a rear end, an axially elongated melting chamber for melting a thermoplastic material in solid rod form located within said housing and having the axial length dimension thereof extending rectilinearly in the front end-rear end direction of said housing, said melting chamber having a discharge end located adjacent to the front end of said housing and an inlet end located toward the rear end of said housing more remote from the front end, a heating element for melting the thermoplastic material is located around and extends in the axial length dimension of said melting chamber at least adjacent the discharge end of said melting chamber, a closure member located at the discharge end of said melting chamber and said closure member forming an openable closure of the discharge end of said melting chamber, said closure member forming a plurality of discharge openings for the molten material flowing from the discharge end of said melting chamber, and a displacement body located in said melting chamber, wherein the improvement comprises that said displacement body is formed integrally with said closure member at the discharge end of said melting chamber and extends in the front end-rear end direction of said housing from the discharge end toward the inlet end of said melting chamber for a length of approximately one-third the axial length dimension of said melting chamber with at least a portion of said displacement body located within the range of said heating element extending in the direction of the axial length dimension of said melting chamber, the surface of said displacement body extending in the front end-rear end direction of said housing is spaced inwardly from the inside surface of said melting chamber and tapers conically inward in the direction toward the discharge end of said melting chamber, and the inside surface of said melting chamber from the inlet end thereof to the discharge end tapers conically inwardly with the tapering ratio of said displacement body being significantly greater than the tapering ratio of the inside surface of said melting chamber so that the surface of said displacement body and the inside surface of said melting chamber are in diverging relationship in the direction approaching the discharge end of said melting chamber.

2. Device, as set forth in claim 1, wherein said displacement body is located concentrically about the axis of the melting chamber, and said discharge openings are located symmetrically around said displacement body and between said closure member and said displacement body.

3. Device, as set forth in claim 1, wherein the tapering ratio of said displacement body is approximately 1:15.

4. Device, as set forth in claim 1, wherein the end of said displacement body more remote from the discharge end of said melting chamber is hemispherically shaped.

5. Device, as set forth in claim 1, wherein the tapering ratio of the inside surface of said melting chamber is approximately 1:50.

6. Device, as set forth in claim 1, wherein an annular groove is formed in the inside surface of said melting chamber adjacent the inlet end thereof with the annular groove encircling the axis of the melting chamber.

7. Device, as set forth in claim 1, wherein said heating element is tubular shaped and is disposed in contact with and encircling the outer surface of said melting chamber in the region of the discharge end of said melting chamber with said heating element being spaced from the inlet end of said melting chamber, insulating means spacing said melting chamber from said housing and also spacing said heating element from said housing.

8. Device, as set forth in claim 7, wherein a one-way valve is located in said closure member for blocking flow from the discharge end of said melting chamber and said one-way valve arranged to open for the passage of molten thermoplastic material therefrom when solid thermoplastic material is advanced through the inlet end into said melting chamber.

* * * * *